(12) United States Patent
Muir et al.

(10) Patent No.: US 9,009,481 B2
(45) Date of Patent: Apr. 14, 2015

(54) SYSTEM AND METHOD FOR PROTECTING CRYPTOGRAPHIC ASSETS FROM A WHITE-BOX ATTACK

(75) Inventors: James Muir, Ottawa (CA); Jiayuan Sui, Burlington (CA); Daniel Elie Murdock, Ottawa (CA); Philip Allan Eisen, Ottawa (CA)

(73) Assignee: Irdeto Canada Corporation, Ottawa (CA)

( * ) Notice: Subject to any disclaimer, the term of this patent is extended or adjusted under 35 U.S.C. 154(b) by 200 days.

(21) Appl. No.: 13/637,811

(22) PCT Filed: Mar. 31, 2010

(86) PCT No.: PCT/CA2010/000486
§ 371 (c)(1),
(2), (4) Date: Sep. 27, 2012

(87) PCT Pub. No.: WO2011/120125
PCT Pub. Date: Oct. 6, 2011

(65) Prior Publication Data
US 2013/0024699 A1 Jan. 24, 2013

(51) Int. Cl.
*H04L 9/00* (2006.01)
*H04L 9/30* (2006.01)
*H04L 9/32* (2006.01)

(52) U.S. Cl.
CPC .............. *H04L 9/002* (2013.01); *H04L 9/3066* (2013.01); *H04L 9/3252* (2013.01); *H04L 2209/16* (2013.01)

(58) Field of Classification Search
CPC ... H04L 9/002; H04L 2209/16; H04L 9/3252; H04L 9/3066
USPC ...................... 713/176, 171, 180; 380/277, 44
See application file for complete search history.

(56) References Cited

U.S. PATENT DOCUMENTS

| 6,668,325 B1 | 12/2003 | Collberg et al. |
| 2005/0002532 A1 | 1/2005 | Zhou et al. |

(Continued)

FOREIGN PATENT DOCUMENTS

| JP | 2003098962 A | 4/2003 |
| JP | 2003124928 A | 4/2003 |

(Continued)

*Primary Examiner* — Baotran N To
(74) *Attorney, Agent, or Firm* — Marc S. Kaufman; Amardeep S. Grewal; Reed Smith LLP

(57) ABSTRACT

A digital signature generation (DSG) process which provides resistance against white box attackers is disclosed. This is done by applying specially selected data transformations to the inputs, outputs and internal parameters of the algorithm. In particular, the signatory's private key does not appear in the clear in our protected implementation. Our new white box implementation produces signatures that are compatible with signatures created by conventional implementations; thus our solution facilitates interoperability and can be used as a drop-in replacement for conventional implementations. In particular, we describe transformations to the key (d) and the generator domain parameter (usually denoted G or g) of the digital signature generation processes, such that embodiments of the invention can produce signed messages which appear to a verifier as if the key (d) was used, without actually ever using the key (d). This makes it impossible for an adversary to ever observe the key (d), as it is not actually used. Further embodiments include additional protections to make it even harder for an adversary to deduce the key (d) by observing the process which generates the digital signature.

20 Claims, 7 Drawing Sheets

(56) References Cited

U.S. PATENT DOCUMENTS

| | | |
|---|---|---|
| 2006/0020811 A1* | 1/2006 | Tan ............................... 713/180 |
| 2006/0140401 A1 | 6/2006 | Johnson et al. |
| 2008/0201398 A1 | 8/2008 | Meyer |
| 2009/0094464 A1 | 4/2009 | Futa et al. |
| 2009/0252327 A1 | 10/2009 | Ciet et al. |
| 2010/0023771 A1* | 1/2010 | Struik ........................... 713/171 |

FOREIGN PATENT DOCUMENTS

| | | |
|---|---|---|
| JP | 2004253950 A | 9/2004 |
| JP | 2006340347 A | 12/2006 |
| JP | 2011075720 A | 4/2011 |
| WO | 0124439 A1 | 5/2001 |
| WO | 0154346 A1 | 7/2001 |

* cited by examiner

Generation of a Digital Signature

Verification of a Digital Signature

ECDSA Signature Generation

Obfuscation of the Generator (G) and Private Key (d)

A Robust Process for Generating ECDSA
Signatures

Creation of a More Robust Process for Generating ECDSA Signatures

SYSTEM AND METHOD FOR PROTECTING CRYPTOGRAPHIC ASSETS FROM A WHITE-BOX ATTACK

CROSS REFERENCE TO RELATED APPLICATIONS

This is the first application for this invention.

FIELD OF THE INVENTION

The present invention relates generally to cryptography. More particularly, the present invention relates to a method and system for protecting cryptographic assets, such as private keys and other secret parameters.

BACKGROUND OF THE INVENTION

The Digital Signature Algorithm (DSA) and the Elliptic Curve Digital Signature Algorithm (ECDSA) are described in the standards FIPS PUB 186-3 (U.S. Department of Commerce) and ANS X9.62-2005 (American National Standard for Financial Services), both of which are herein incorporated by reference in their entirety. These signature algorithms use public-key cryptography to enable the creation and verification of digital signatures on digital messages. Signatories in DSA and ECDSA possess a private key and a public key; the private key is used to generate a digital signature (i.e., to sign a message) and the public key is used by third parties to validate that signature.

DSA and ECDSA are widely deployed (e.g., in ssh, SSL/TLS, Canada Post digital postmarks, DTCP, AACS, MS-DRM) and can be used to provide data origin authentication, data integrity, and non-repudiation. However, any assurances that DSA and ECDSA signatures might provide are always subject to the assumption that a signatory's private key remains private (i.e., the private key does not leak to an attacker).

The following references provide additional background information, and are each incorporated by reference in their entirety:

[1] American National Standard for Financial Services, ANS X9.62-2005, Public Key Cryptography for the Financial Services Industry, The Elliptic Curve Digital Signature Algorithm (ECDSA), 16 Nov. 2005.
[2] D. Hankerson, A. Menezes, S. Vanstone, Guide to Elliptic Curve Cryptography, 2003.
[3] Information Technology Laboratory, National Institute of Standards and Technology, FIPS PUB 186-3, Digital Signature Standard (DSS), June 2009.
[4] Standards for Efficient Cryptography, SEC 1: Elliptic Curve Cryptography, Version 2.0, 21 May 2009.
[5] National Security Agency, NSA Suite B Cryptography, available from http://www.nsa.gov/ia/programs/suiteb_cryptography/
[6] Digital Transmission Content Protection Specification, Volume 1 (Informational Version), Revision 1.51, 1 Oct. 2007.

The signature generation operation of ECDSA and DSA is typically implemented in computer software, which is then run on a particular computing device (e.g., a cell phone, set-top box, smart card). In many applications, this operation takes place in an environment outside the signatory's control—possibly in the presence of adversaries (i.e., an adversary might observe the device as a signature is being computed).

An adversary who analyzes only the inputs and outputs of signature generation effectively treats that implementation like a black box. DSA and ECDSA were designed to resist such black box attackers. However, there is often more information available than just inputs and outputs. Additional information such as device power consumption, execution time, electromagnetic emanations, and response to data faults can give clues to an attacker about the execution of the software; it has been shown that this can leak bits of the private key and completely compromise the signature scheme.

A much more robust security model considers resistance against white box attackers. White box attackers have full visibility into the execution of the software that computes the signature. Resistance against white box attackers is a highly desired goal, but no white box implementations of DSA or ECDSA have yet been proposed.

As a concrete example of this problem, consider the DTCP protocol used to protect audio/video content. The following quotation comes from the DTCP specification, as defined in reference [6] above:

4.3 Manufacture of Compliant Devices

All compliant devices that support Full Authentication (that is, each item manufactured, regardless of brand and model) will be assigned a unique Device ID (XID) and device EC-DSA public/private key pair generated by the DTLA. [The private key] must be stored within the device in such a way as to prevent its disclosure. Compliant devices must also be given a device certificate (XCERT) by the DTLA. This certificate is stored in the compliant device and used during the authentication process. In addition, the compliant device will need to store the other constants and keys necessary to implement the cryptographic protocols.

The sentence emphasized above states that DTCP compliant devices must take steps to protect their ECDSA private key. However, such devices must utilize their private key during the Full Authentication protocol to create an ECDSA signature. While it may seem as though the private key can be simply be protected by storing it in an encrypted state, the fact is that, to carry out the signature operation, the private key would first have to be decrypted in order to be used, at which point it could be extracted by a white box attacker. To alleviate this problem what is needed is a protection process that keeps the private key confidential and permits a digital signature operation to be carried out without leaking the private key to the attacker.

SUMMARY OF THE INVENTION

It is an object of the present invention to obviate or mitigate at least one disadvantage of previous digital signature processes. In particular, one aspect of the invention is directed to a process which more securely protects the key of the signer from being deduced by an adversary who is able to observe the digital signature process in operation.

Accordingly, aspects of the invention are directed to methods and systems for implementing a digital signature generation (DSG) process which provide resistance against white box attackers. This is done by applying specially selected data transformations to the inputs, outputs and internal parameters of the algorithm. In particular, the signatory's private key does not appear in the clear in our protected implementation. Our new white box implementation produces signatures that are compatible with signatures created by conventional implementations; thus our solution facilitates interoperability and can be used as a drop-in replacement for conventional implementations. In particular, we describe transformations to the key (d) and the generator domain parameter (usually denoted G or g) of the digital signature generation processes, such that embodiments of the invention can produce signed messages which appear to a verifier as if the key (d) was used, without actually ever using the key (d). This makes it impossible for an adversary to ever observe the key (d), as it is not actually used. Further embodiments include additional protections to make it even harder for an adversary to deduce the key (d) by observing the process which generates the digital signature.

One aspect of the invention provides a method and system for producing a transformed key ($\hat{d}$), by transforming d based on a random integer f, which can be used along with a transformed generator (e.g., $\hat{G}$ or $\hat{g}$), and f itself, to produce a compatible signed messaged. According to such an aspect, the transformed generator is produced based on the generator, and the inverse of f modulo n. Then the DSG is slightly modified to use said transformed generator (e.g., $\hat{G}$ or $\hat{g}$) and $\hat{d}$, in place of said generator (G or g) and d, along with incorporating f, in said DSG process to produce a digital signature which can be verified by said verification process using the public key Q as if d and said generator were actually used in said DSG process.

In an aspect, the present invention provides a computer implemented method of protecting a cryptographic secret key (d), which has a corresponding cryptographic public key Q, wherein both Q and d relate to a generator of order n, wherein d is stored and used on a computing apparatus A, from an adversary B able to observe A during execution of a cryptographic digital signature generation (DSG) process which utilizes d, said DSG process having a known signature verification process which utilizes Q, said method comprising:
 a) choosing a random integer f in the interval between 1 and n−1;
 b) producing a transformed generator based on said generator and the inverse of f modulo n;
 c) producing a transformed key ($\hat{d}$) by transforming d based on f; and
 d) utilizing said transformed generator and $\hat{d}$, in place of said generator and d, along with incorporating f, in said DSG process to produce a digital signature which can be verified by said verification process using Q as if d and said generator were actually used in said DSG process.

In a further aspect, there is provided a computer implemented method of protecting a cryptographic secret key (d), which has a corresponding cryptographic public key Q, wherein both Q and d relate to a generator of order n, wherein d is stored and used on a computing apparatus A, from an adversary B able to observe A during execution of a cryptographic digital signature generation (DSG) process which utilizes d, said cryptographic process having a known signature verification process which utilizes Q, said method comprising:
 a) choosing a random integer f in the interval between 1 and n−1;
 b) producing a transformed generator based on said generator and the inverse of f modulo n;
 c) producing a transformed key ($\hat{d}$) by transforming d based on f; and
 d) producing a computer program product embodied in a machine readable medium which stores machine executable instructions, which when executed by A, cause A to utilize said transformed generator and d, in place of said generator and d, along with adding f, in said DSG process to produce a digital signature which can be verified by said verification process using Q as if d and said generator were actually used in said DSG process.

In a further aspect, the present invention provides a computer program product comprising a tangible computer readable medium storing computer readable instructions, which when executed by a processor, cause said processor to implement a method of protecting a cryptographic secret parameter (d) which has a corresponding cryptographic public parameter Q, wherein both Q and d relate to a generator of order n, wherein d is stored and used on a computing apparatus A, from an adversary B able to observe A during execution of a cryptographic process which utilizes d, said cryptographic process having a known complimentary process which utilizes Q, said computer readable instructions comprising:
 a) instructions for choosing a random integer f in the interval between 1 and n−1;
 b) instructions for calculating a transformed generator value of said generator based on an inverse of f mod n
 c) instructions for calculating a transformed value $\hat{d}$ of d based on f; and
 d) storing said values of f, said transformed generator and $\hat{d}$ in a secure manner for subsequent use in a transformed cryptographic process which uses f, said transformed generator and $\hat{d}$ to produce a digital signature which can be verified by said complimentary process using Q as if d and said generator were actually used in said cryptographic process.

In further aspect, the present invention provides a computer program product comprising a tangible computer readable medium storing computer readable instructions, which when executed by a computing apparatus (A), cause said computing apparatus to produce a digital signature (r, s) on a message M which can be verified by a standard ECDSA digital signature verification process for verifying a signature (r, s) on a message M purported to have originated with the holder of a private key d, in which said private key d has a corresponding cryptographic public key Q, wherein both Q and d relate to a generator G of order n, said signature producible while protecting d from an adversary able to observe A during execution of said computer readable instructions, said computer readable instructions comprising:
 i) instructions for choosing a random integer $\hat{k}$ in the interval [1, n−1];
 ii) instructions for assigning the result of EC_Multiply($\hat{k},\hat{G}$) to a point R, wherein EC_Multiply($\hat{k},\hat{G}$) means add the elliptic curve point $\hat{G}$ to itself $\hat{k}$ times, said elliptic curve point $\hat{G}$ having been previously generated based on a transformation of said generator G using a previously chosen random integer f in the interval between 1 and n−1;
 iii) instructions for assigning the result of $R_x$ mod n to r, where $R_x$ is the x co-ordinate of R;
 iv) instructions for branching again to i) if r=0, otherwise;
 v) instructions for assigning the value of a hash operation on the message M to e;
 vi) instructions for computing the value of $\hat{k}^{-1}(ef+\hat{d}r)$ mod n and assign this value to s, wherein $\hat{d}$ is a previously determined transformed value of d based on f;
 vii) instructions for branching again to i) if s=0, otherwise;
 v) instructions for transmitting the digitally signed message M, along with the signature (r, s) to a 3rd party for verification; and
 wherein said signature (r, s) on the message M is equivalent to that which would have been generated by a standard ECDSA process using the private key d, except that the actual private key d is not used and is therefore never loaded into memory during execution. Further, as described herein, according to another aspect, such a computer program product can be adapted to DSA.

In further aspect, the present invention provides a computer product comprising a tangible computer readable medium storing computer readable instructions, which when executed by a computing apparatus (A), cause said computing apparatus to produce a digital signature (r, s) on a message M using offline transformed values to do the signing, as disclosed herein.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for protecting cryptographic assets, which include private keys, secret parameters, and the like, in Digital Signature Generation Processes.

Figure 1:
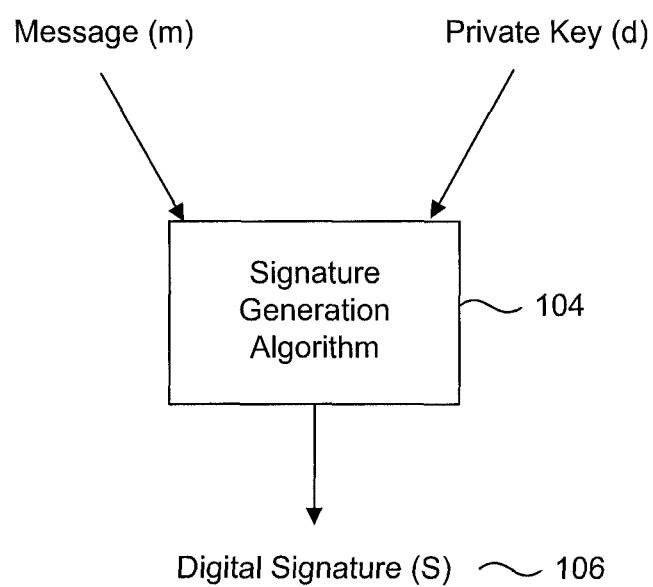
FIG. 1 is a flowchart illustrating the generic process of digital signature generation.

A generic Digital Signature Generation Process is illustrated in FIG. 1, in which a message (m) is signed with a private key (d), using a Signature Generation algorithm 104, to produce a Digital Signature (S).

Figure 2:
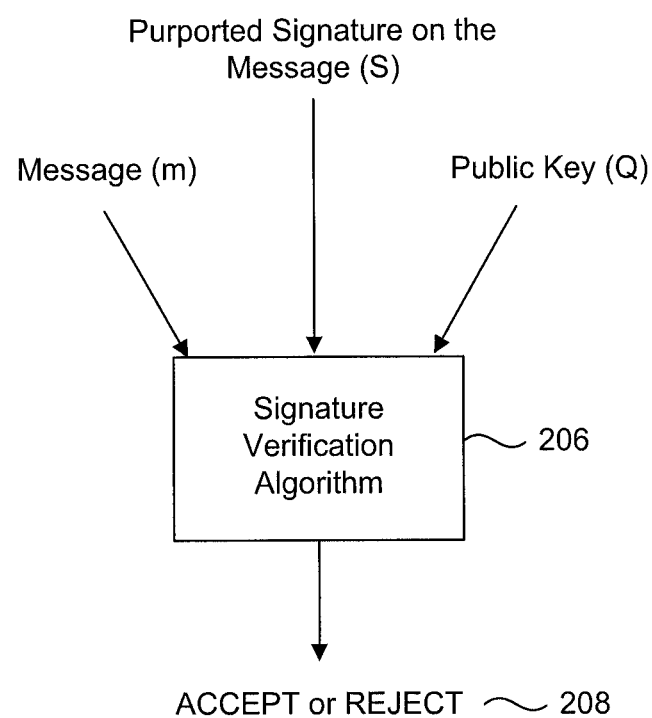
FIG. 2 is a flowchart illustrating the generic process of digital signature verification.

A generic Digital Signature Verification Process is illustrated in FIG. 2, in which a Digital Signature (S) on a message (m), which is purported to have been signed by the holder of the private key (d), is verified using the holder's public key (Q) using a Signature verification algorithm 206. The advantage of such a process is that anyone can use the public key (Q) to verify the signature, and the process will accept or reject 208 the signature, depending on whether it was in fact signed by the holder of the private key (d).

One aspect of the invention provides methods and systems which can produce a signature (S), while protecting d which is compatible with existing verification processes. In other words, embodiments of the invention will produce S on a computing apparatus A, which may be in the presence of an adversary B who is actively trying to obtain d by observing the signature generation process, which can be verified by 206, using Q, without requiring the verifier change the process 206.

We describe exemplary processes for converting an implementation of DSA or ECDSA signature generation into a one that resists white box attackers, according to embodiments of the invention, in the following sections.

Note that we use the term smooth to refer to a conventional, unprotected implementation of signature generation (i.e., an implementation that is vulnerable to white box attackers), and we use the term robust to refer to a protected implementation, according to embodiments of the invention.

Notation

Below we define some terms and notation related to elliptic curve cryptography (ECC) using similar notation described in reference [2]:

| | |
|---|---|
| E | an elliptic curve equation, usually of the form $y^2 = x^3 + ax + b$. |
| elliptic curve point | an ordered pair (x, y), which satisfies a given equation, E. |
| a, b | coefficients of an elliptic curve equation. |
| $F_p$ | a finite field of cardinality p, where p is a prime. |
| $\infty$ | the point-at-infinity |
| $E(F_p)$ | the elliptic curve group formed by the set of all elliptic curve points, (x, y), along with the point-at-infinity. Note that x and y are elements of $F_p$. |
| G | denotes a particular elliptic curve point designated as the generator, or base point. It is publicly known. |
| $G_x, G_y$ | the x-coordinate and y-coordinate, respectively, of the point G. |
| kG | the elliptic curve point that results when G is added to itself k times. |
| $\langle G \rangle$ | the subgroup of $E(F_p)$ generated by the point G. |
| n | the cardinality of the group $\langle G \rangle$. |
| [1, n − 1] | the set of all integers i such that $1 \le i$ and $i \le n - 1$. |
| d | a private key, which is an integer in the interval [1, n − 1]. |
| Q | a public key, which satisfies the relation Q = dG. |
| H | a cryptographic hash function (e.g., SHA256). |
| (r, s) | an ECDSA signature. r and s are integers in the interval [1, n − 1]. |

Smooth ECDSA

Here we summarize the unprotected ECDSA Signature Generation operation, which follows the description in ANSX9.62[1].

Before using ECDSA, a choice must be made on a particular elliptic curve, a cryptographic hash function (H) and a generator point G; this information (sometimes referred to as domain parameters) is generally considered to be non-secret.

The following represents the conventional (i.e., smooth) process for signing a message using ECDSA:

| Algorithm 1 Smooth ECDSA Signature Generation |
|---|
| Input: a message M, a private key d. |
| Output: a signature on M consisting of a pair of integers (r, s) in the interval [1, n − 1]. |
|   1: choose a random integer k in the interval [1, n − 1]. |
|   2: R ← kG. |
|   3: r ← $R_x$ mod n. If r = 0, then go to Step 1. |
|   4: e ← H(M). |
|   5: s ← $k^{-1}$(e + dr) mod n. If s = 0, then go to Step 1. |
|   6: return (r, s) |

Elliptic curve arithmetic is used only in Step 2 to compute the point R; the operations in Steps 3 and 5 are ordinary arithmetic modulo n. Note that the private key, d, is used only at Step 5.

Figure 3:
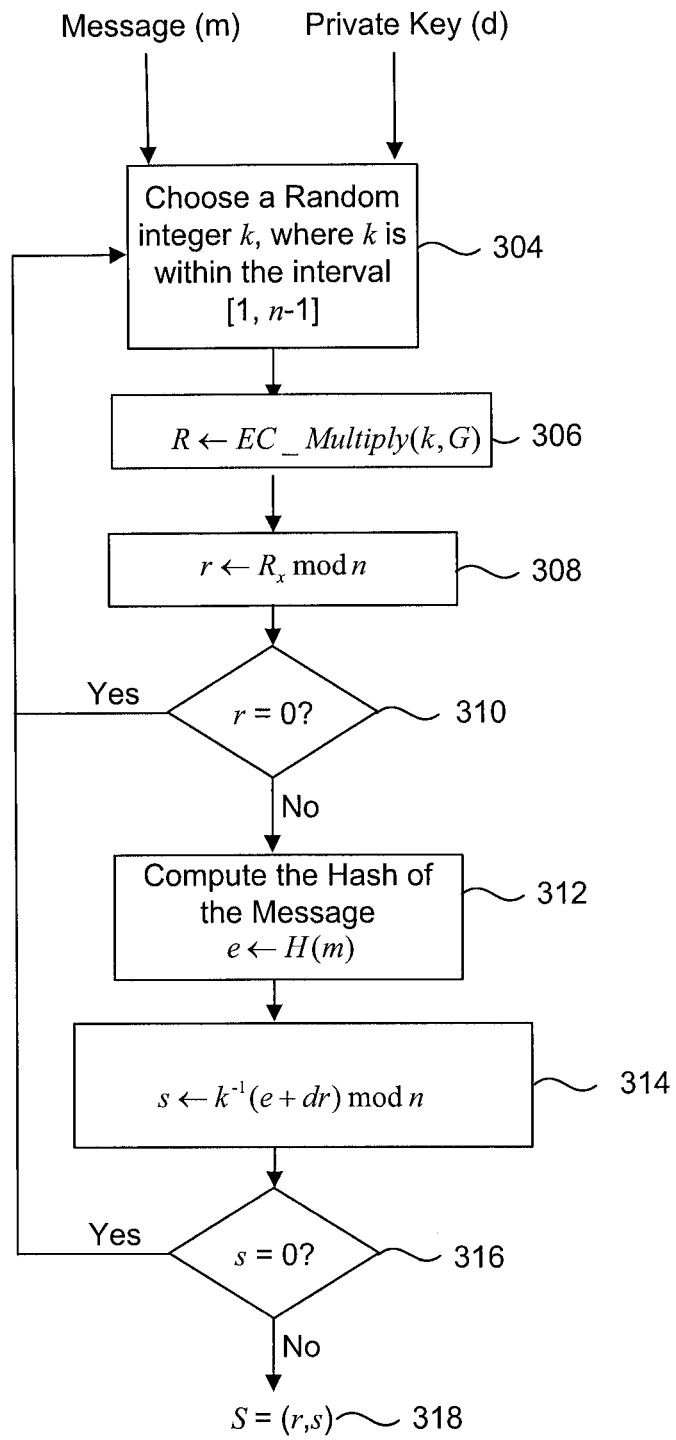
FIG. 3 is a flowchart illustrating the steps of ECDSA signature generation.

This process is illustrated in FIG. 3. Step 1 as set out above, is labeled as block 304 in that figure. Similarly, Step 2 as set out above, is labeled as block 306 in that figure. Note that as should be readily apparent to a person skilled in the art, step 2 does not involve integer multiplication but rather elliptic curve multiplication, as G is an elliptic curve point. In Step 2, R is assigned (denoted as →) the point that results when G is added to itself k times, and the notation EC_Multiply(k,G) is used herein to denote this type of elliptic curve multiplication. Step 3 as set out above, is labeled as block 308 and decision 310, and involves assigning the result of $R_x$ mod n to r, where $R_x$ is the x co-ordinate of R, assuming r is non-zero otherwise the process branches back to step 1. Step 4, as illustrated in FIG. 3 at block 312, involves assigning to e the value that results when the Hash function is applied to the message; application of the hash function to the message is denoted H(M). Step 5 as set out above, is labeled as block 314 and decision 316, and involves assigning the result of $k^{-1}(e+dr)$ mod n to the value s, resulting in the output 318 of the Signature S=(r, s).

During the above signature generation process, there are actually two highly sensitive values that must be protected:
1. the private key, d.
2. the per-message secret, k.

That d must be protected is clear. However, if the value of k is leaked, then an adversary can derive d from k. As the hash function H is known, e can be determined from the message M. Accordingly, if an adversary obtains k, an adversary can obtain the private key from the resulting signature (r, s) on M by solving the following equation modulo n:

$$s = k^{-1}(e+dr)$$

Here we have a single equation with d being the only unknown. Thus, d can be solved for. This is a potential security problem.

Accordingly, an adversary B who observes a computing apparatus A which executes a conventional DSG process, can derive the private key d simply by watching for a call to a random number generator and noting the selection of the value k. Alternatively, an adversary B might observe the instructions executed on apparatus A to compute kG and thereby derive k.

Robust ECDSA

We now discuss an exemplary process for creating a robust implementation of ECDSA signature generation, according to an embodiment of the invention.

In some manner not observable by an adversary B, for example during an off-line setup phase, we perform a preliminary process, according to an embodiment. This preliminary process involves selecting a secret number f in the interval [1, n–1]. f will be used to protect the private key, d. According to an embodiment, two transformation processes are invoked (both of which are related to f) to produce a transformed (or obfuscated) key and transformed (or obfuscated) generator having the values:

$\hat{G} = f^{-1}G$, where $f^{-1}$ is computed modulo n.
$\hat{d} = fd$ mod n.

Both $\hat{G}$ and $\hat{d}$ can be computed off-line, immediately following the selection of f.

Figure 4:
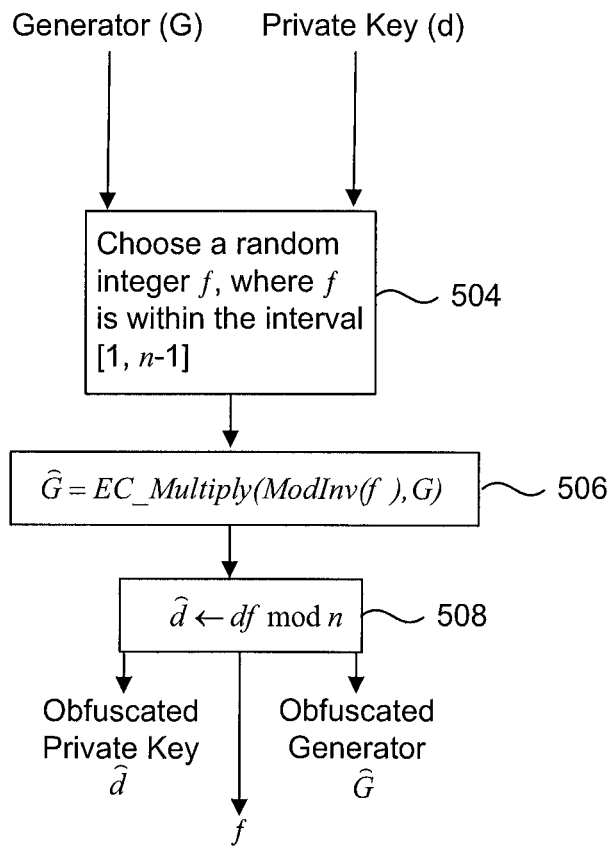
FIG. 4 is a flowchart illustrating the steps of an preliminary procedure, according to an embodiment of the invention.
Figure 5:
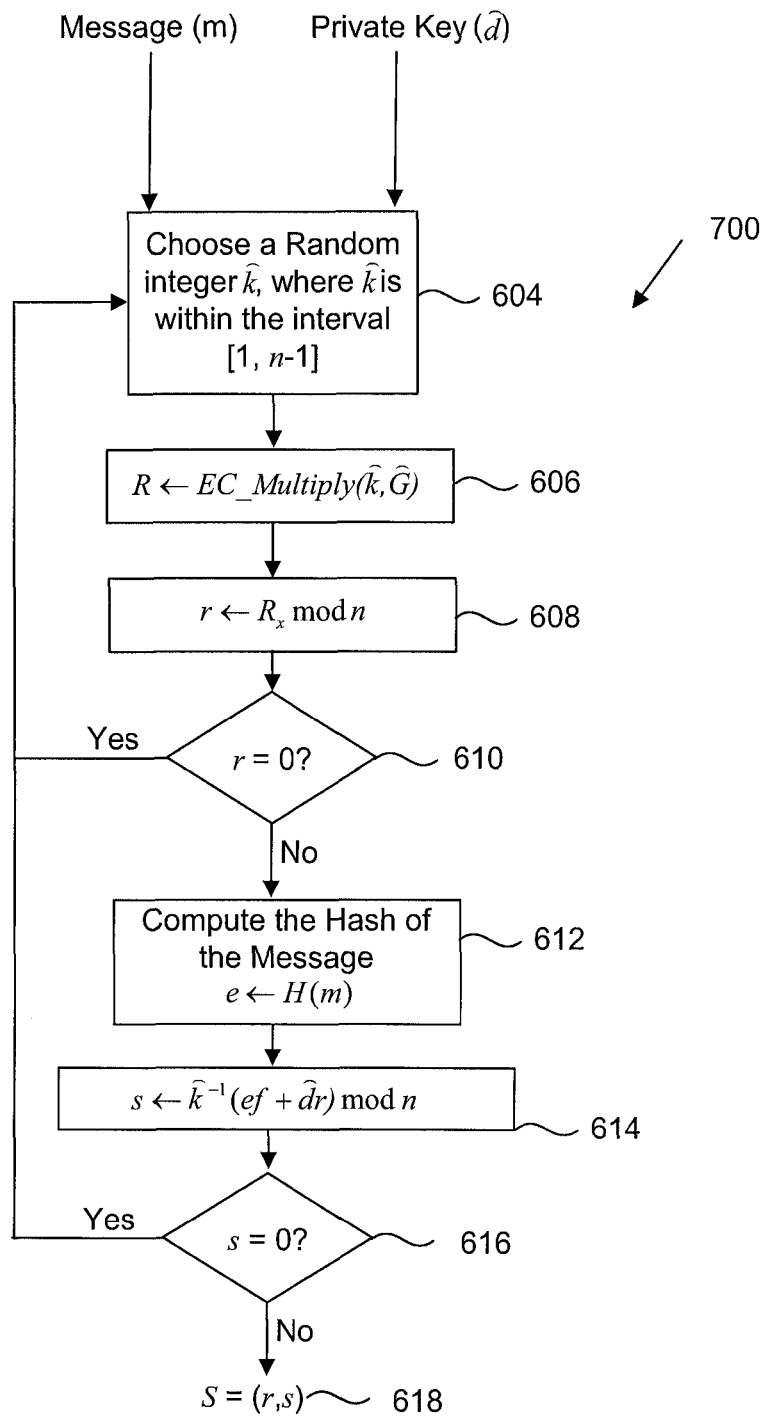
FIG. 5 is a flowchart illustrating the steps of a process for generating ECDSA signatures according to an embodiment of the invention.

This preliminary process, according to an embodiment, is illustrated in FIG. 5. In the flowchart of FIG. 4, the inputs are the known generator, in this case G, and the private key d. The process starts by choosing 504 a random integer f, where f is within the interval [1, n–1]. The transformed generator $\hat{G}$ is determined 506, by computing the inverse of f modulo n (denoted $f^{-1}$), and then performing elliptic curve multiplication of $f^{-1}$ and G. Then, the transformed (or obfuscated) key $\hat{d}$ is assigned the value of fd mod n at 508. The outputs are the random integer f, the transformed (or obfuscated) key $\hat{d}$ and transformed (or obfuscated) generator $\hat{G}$. All 3 of these values will be used in an embodiment of a Robust ECDSA Signature Generation process, as discussed below.

Here are the basic steps of a robust signing process, according to an embodiment of the invention:

Algorithm 2 Robust ECDSA Signature Generation

Input: a message M, a private key d.
Output: a signature on M consisting of a pair of integers (r, s) in the interval [1, n – 1].
1: choose a random integer $\hat{k}$ in the interval [1, n – 1].
2: R ← $\hat{k}\hat{G}$
3: r ← $R_x$ mod n. If r = 0, then go to Step 1.
4: e ← H(M).
5: s ← $\hat{k}^{-1}(ef + \hat{d}r)$ mod n. If s = 0, then go to Step 1.
6: return (r, s)

As can be seen above, such an embodiment which incorporates a Robust ECDSA Signature Generation process, utilizes the transformed generator $\hat{G}$ and $\hat{d}$, in place of the generator G and d, along with incorporating f (see Step 5), in said ECDSA Signature Generation process to produce a digital signature S=(r,s) which can be verified by a conventional ECDSA verification process using Q as if d and said generator G were actually used in a ECDSA Signature Generation process. In brief, f is incorporated into the process by replacing e with ef in step 5. By utilizing f in Step 5 in this manner—and recall that f was used in the transformations made offline to produce $\hat{G}$ and $\hat{d}$—the resulting signature is fully compatible with one made by a conventional process.

Figure 6:
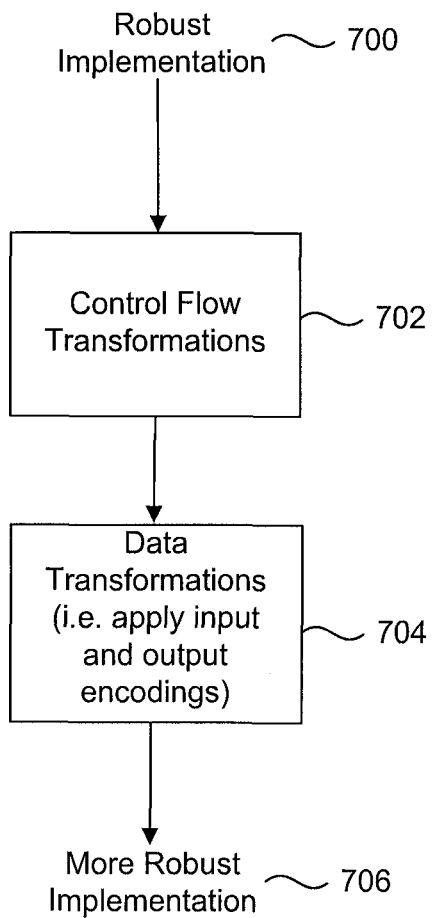
FIG. 6 is a flowchart illustrating the steps of creating a process for making such ECDSA signature generation process more robust according to an embodiment of the invention.

A flowchart that illustrates the above process, according to an embodiment of the invention is shown in FIG. 5. Step 1 in the process 700, as set out above, is labeled as block 604 in that figure. Similarly, Step 2 as set out above, is labeled as block 606 in that figure. Note that as should be readily apparent to a person skilled in the art, step 2 does not involve integer multiplication but rather elliptic curve multiplication, as $\hat{G}$ is a point on a curve. Accordingly, R is assigned the point that results when $\hat{G}$ is added to itself $\hat{k}$ times. Step 3 as set out above, is labeled as block 608 and decision 610, and involves assigning the result of $R_x$ mod n to the value r, where $R_x$ is the x co-ordinate of R, assuming r is non-zero otherwise the process branches back to step 1. Step 4, as illustrated in FIG. 6 at block 612, involves assigning to e the value that results when the hash function H is applied to the message (denoted by H(M)). Step 5 as set out above, is labeled as block 614 and decision 616, and involves assigning the result of $\hat{k}^{-1}(ef+\hat{d}r)$ mod n to the value s, resulting in the output 618 of the Signature S=(r, s).

This version of signature generation produces signatures that are fully compatible with ordinary ECDSA (i.e., any signature (r,s) created by our robust implementation could have also been created by a smooth implementation).

Analysis

Embodiments of the invention are intended to address the following two goals:
1. Prevent an attacker from being able to deduce the private key from learning the value of the per-message random number $\hat{k}$. As mentioned previously, if an attacker learns the per-message secret k, then it is possible using a conventional DSG to calculate the secret key d from the message M and its signature (r, s). As explained below, that is not the case here with $\hat{k}$.

2. Prevent an attacker from learning d. d is the secret key. Note that without other forms of protection the value of $\hat{d}$ can potentially be observed during the execution of a signing algorithm by an adversary in a white-box environment. Accordingly, an embodiment adds another layer of protection to $\hat{d}$ by having an additional data transform applied to it. However, the value $\hat{d}$, by itself, leaks no information about d in the following sense: Suppose x is the value of $\hat{d}$. For every integer d in the interval [1, n−1] there exists a value of f that causes $\hat{d}$=fd mod n to equal x (i.e., take f equal to $xd^{-1}$ mod n). Thus, is it not possible for an attacker to rule out any possible value of d using only the value of $\hat{d}$.

To meet the goals above, it does not seem necessary to use additional resources to attempt to add further protection to the computation of R in Step 2. We rationalize this statement as follows.

Consider the three values used in Step 2: R, $\hat{k}$, $\hat{G}$. Suppose these values are all known to an adversary. Assume further that the attacker knows the value of G since it often appears in publicly available standards. Since $\hat{G}=f^{-1}G$, the adversary might try to compute $f^{-1}$, and hence f, from this equation, which would contradict goal 2 above. However, this computation amounts to solving an ECDLP, which is assumed to be infeasible. Thus we are confident that an adversary cannot compute f from G and $\hat{G}$.

Further, regarding goal 1 as set out above, knowledge of $\hat{k}$ does not reveal the secret key d in the same way that knowledge of k does in a conventional ECDSA. This is because the task of computing d from $\hat{k}$ and the signature (r, s) amounts to solving the following equation modulo n:

$s=\hat{k}^{-1}(e+dr)f$

However, unlike for conventional DSGs, the above equation includes two unknown values: d and f (i.e., we have one equation and two unknowns). Therefore the adversary is not able to extract d from this one equation, even if they learn $\hat{k}$, as both d and f are unknown.

While the embodiments discussed above modify DSGs in such a manner as to make such a process more robust than conventional DSGs, such an improved system can be made even more robust by making it harder for an attacker to learn f. Accordingly, embodiments of the invention, perform the preliminary steps of choosing f, and producing the transformed values $\hat{G}$ and $\hat{d}$ in some manner not observable by B. One way of performing these steps in a manner not observable by B is to perform these steps offline. By offline, we mean in a time or place such that either A is not observable by B, or on a different computing apparatus altogether. For example, in the case of A being a smart card or set top box, offline includes prior to shipping said device. In the case of A being a personal computer, these steps can be executed on another computer, and provided to A by some secure media. Alternatively, these steps can be executed in a manner not observable B by utilizing secure hardware.

Further, in a preferred embodiment, additional obfuscation techniques are utilized to make it harder for an adversary to deduce the values of f and $\hat{d}$ from observing the computations in Step 5 (i.e., $s \leftarrow \hat{k}^{-1}(ef+dr)$ mod n). According to one embodiment, step 5 is calculated by executing the following process. First, we create two multiplication functions (which can take the form of software routines obfuscated using a series of look-up tables):

mult_by_f( . . . ),mult_by_dhat( . . . )

These functions, which according to one embodiment incorporate word-wise recode-tables constructed during the off-line phase, will take a multi-precision integer x as input (i.e., an array of 32-bit words) and return, respectively, xf mod n and x$\hat{d}$ mod n. These two functions will be utilized as follows to carry out the computations of Step 5, according to one embodiment:

$e\_f \leftarrow \text{mult\_by\_}f(e)$          5.1:

$dhat\_r \leftarrow \text{mult\_by\_}dhat(r)$          5.2:

$tmp \leftarrow e\_f + dhat\_r \mod n$          5.3:

$s \leftarrow \hat{k}^{-1} * tmp \mod n$          5.4:

DSA

Note that for illustrative purposes, we focused above primarily on ECDSA. However ECDSA and DSA are closely related. We submit that one skilled in the art should be able to easily apply the detailed explanation and the examples we have presented above with respect to ECDSA, to DSA signature generation. However, we now set out a brief summary of the process, according to an embodiment of the invention.

Here we summarize the unprotected DSA Signature Generation operation, which follows the description in FIPS PUB 186-3 [3].

Before using DSA, a choice must be made for certain domain parameters: a prime p, a prime q (which divides p−1), a generator g of order q modulo p. The domain parameters are generally considered to be non-secret.

Here is how you sign a message using DSA:

| Algorithm 3 Smooth DSA Signature Generation |
| --- |
| Input: a message M, a private key d.<br>Output: a signature on M consisting of a pair of integers (r, s) in the interval [1, q − 1].<br>  1: choose a random integer k in the interval [1, q − 1].<br>  2: $r_p \leftarrow g^k \mod p$.<br>  3: $r \leftarrow r_p \mod q$. If r = 0, then go to Step 1.<br>  4: $e \leftarrow H(M)$.<br>  5: $s \leftarrow k^{-1}(e + dr) \mod q$. If s = 0, then go to Step 1.<br>  6: return (r, s) |

Note that the arithmetic operations above are all modular arithmetic (i.e., arithmetic modulo p or arithmetic modulo q)

During signature generation, there are actually two highly sensitive values that must be protected:

1. the private key, d.
2. the per-message secret, k.

That d must be protected is clear. If the value of k is leaked, then an adversary can derive d from k and the resulting signature (r, s) on M by solving the following equation modulo q:

$s=k^{-1}(e+dr)$

Robust Signature Generation

One embodiment for creating a robust implementation of a DSA signature generation is as follows.

Similar to above, in some manner not observable by an adversary B, for example during an off-line setup phase, we select a secret number f in the interval [1, q−1]. f will be used to protect the private key, d. According to an embodiment, two transformation processes are invoked (both of which are related to f) to produce a transformed key and transformed generator having the values: f:

$\hat{g} = g^{f^{-1}} \mod p$, where $f^{-1}$ is computed modulo q.
$\hat{d} = fd \mod q$.

Both $\hat{g}$ and $\hat{d}$ can be computed off-line, immediately following the selection of f. Here are the basic steps of a robust DSA signing process, according to an embodiment of the invention:

---
Algorithm 4 Robust DSA Signature Generation
---

Input: a message M, a private key d.
Output: a signature on M consisting of a pair of integers (r, s) in the interval [1, q − 1].
  1: choose a random integer $\hat{k}$ in the interval [1, q − 1].
  2: $r_p \leftarrow \hat{g}^{\hat{k}} \bmod p$.
  3: $r \leftarrow r_p \bmod q$. If r = 0, then go to Step 1.
  4: $e \leftarrow H(M)$.
  5: $s \leftarrow \hat{k}^{-1}(ef + \hat{d}r) \bmod q$. If s = 0, then go to Step 1.
  6: return (r, s)

---

This version of signature generation produces signatures that are fully compatible with ordinary DSA (i.e., any signature (r, s) created by our robust implementation could have also been created by a smooth implementation).

Further Protections

Figure 7:
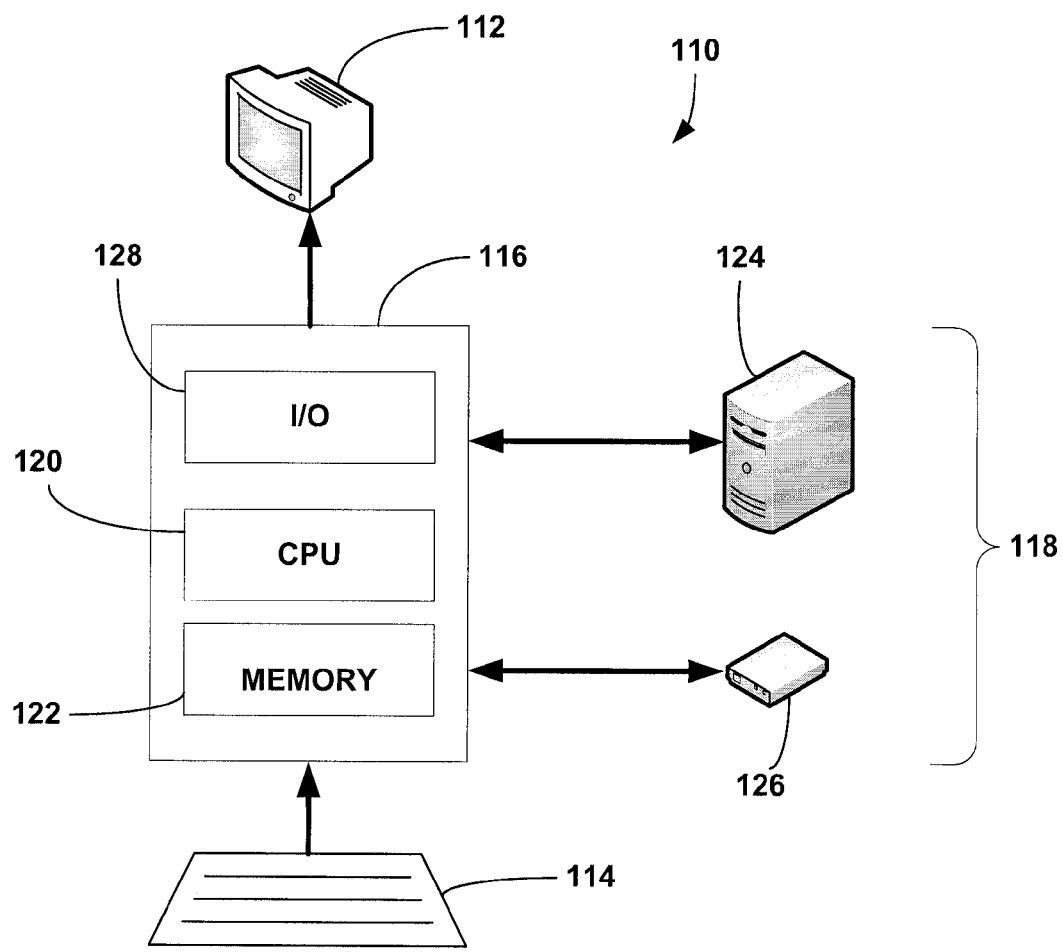
FIG. 7 is a block diagram illustrating a simplified example of a computer system upon which embodiments of the invention may be performed.

Regardless of which of the above embodiments is implemented, control flow transformations and data transformations can be applied to the source code that implements the signature generation operation, in order to make it harder for an adversary to deduce sensitive parameters, for example $\hat{d}$ or f, by observing the operation of the computing device which executes the DSG process. FIG. 7 is a flowchart which illustrates an exemplary process for further protecting the parameters, by obfuscating the software which generates the signature, according to an embodiment of the invention. Accordingly, the source code which implements the process 700 described above, can be further protected by applying control flow transformations 702 and data transformations 704 to produce a more robust implementation.

The control flow transformations 702 map the control-flow of a given program into a new control-flow form, using a number of functions to control the flow, and include the exemplary control-flow transformations as described in U.S. Pat. No. 6,779,114, issued Aug. 17, 2004, which is incorporated herein by reference in its entirety). The data transformations 704 involve the use of mathematical mapping functions which transform both data operations and locations to alternate mathematical spaces, examples of which are described in U.S. Pat. No. 6,594,761, issued Jul. 15, 2003, U.S. Pat. No. 6,842,862 issued Jan. 11, 2005, and US Patent Publication No. US-2005-0166191A1, published Jul. 28, 2005, the contents of which are incorporated herein by reference in their entirety.

In another embodiment, to offer another level of protection for f we compute ef mod n (which is used in Step 5) in another manner. Since the value e is equal to the hash of the input message, M, an embodiment of the invention incorporates the multiply by f modulo n operation into the hash computation. As will be appreciated, this depends on the nature of the hash function used, but assuming a suitable hash function, in such an embodiment the hash function H is replaced with a function $H_f$ which produces as a result the value $\hat{e} = H_f(M) \bmod n = e*f \bmod n$. Further, in step 5, the term ef is replaced with $\hat{e}$, such that $\hat{k}^{-1}(ef+\hat{d}r) \bmod n$ is replaced with $\hat{k}^{-1}(\hat{e}+\hat{d}r) \bmod n$.

It should be understood that the present invention may be practiced upon any given computer system. A simplified example of a computer system upon which an embodiment of the invention may be performed is presented as a block diagram in FIG. 7. This computer system 110 includes a display 112, keyboard 114, computer 116 and external devices 118.

The computer 116 may contain one or more processors or microprocessors, such as a central processing unit (CPU) 120. The CPU 120 performs arithmetic calculations and control functions to execute software stored in an internal memory 122, preferably random access memory (RAM) and/or read only memory (ROM), and possibly additional memory 124. The additional memory 124 may include, for example, mass memory storage, hard disk drives, floppy disk drives, magnetic tape drives, compact disk drives, program cartridges and cartridge interfaces such as those found in video game devices, removable memory chips such as EPROM or PROM, or similar storage media as known in the art. This additional memory 124 may be physically internal to the computer 116, or external as in FIG. 7.

The computer system 110 may also include other similar means for allowing computer programs or other instructions to be loaded. Such means can include, for example, a communications interface 126 which allows software and data to be transferred between the computer system 110 and external systems. Examples of communications interface 126 can include a modem, a network interface such as an Ethernet card, a serial or parallel communications port. Software and data transferred via communications interface 126 are in the form of signals which can be electronic, electromagnetic, and optical or other signals capable of being received by communications interface 126. Multiple interfaces, of course, can be provided on a single computer system 110.

Input and output to and from the computer 116 is administered by the input/output (I/O) interface 128. This I/O interface 128 administers control of the display 112, keyboard 114, external devices 118 and other such components of the computer system 110.

The invention is described in these terms for convenience purposes only. It would be clear to one skilled in the art that the invention may be applied to other computing apparatus or control systems 110. Thus the term computer apparatus is intended to include a variety of systems including all manner of appliances having computer or processor control including telephones, cellular telephones, televisions, television set top units, point of sale computers, automatic banking machines, lap top computers, servers, personal digital assistants and automobiles. Such computer apparatus may include additional components, or omit some of the components discussed above with reference to FIG. 7, Further it should be appreciate that the "offline" portions could be executed on a different computing apparatus than the computing apparatus which performs the signing operation. Further, the computing apparatus which executes the verification process will usually be different than the computing apparatus which executes the digital signing process, and the signed message is often transmitted via some medium. So an aspect of the invention is directed to a system comprising a signing computer apparatus for generating and transmitting a digital signature, and a verifying computer apparatus for verifying the signature. Further, an embodiment could include an additional computer apparatus for executing the preliminary steps of choosing f and producing the transformed key and transformed generator based on f.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

The invention claimed is:

1. A method executed by one or more computing devices for protecting a cryptographic private key during cryptographic digital signature generation, the method comprising:
   generating, by at least one of the one or more computing devices, a random integer in the interval between 1 and n−1, wherein n corresponds to the cardinality of a group of points on an elliptical curve that are generated within a finite field from a generator point on the elliptical curve and wherein n is greater than or equal to 1;
   calculating, by at least one of the one or more computing devices, a multiplier based on the random integer, wherein the multiplier is equal to the inverse of the random integer modulo n;
   determining, by at least one of the one or more computing devices, a transformed generator point by performing elliptical curve multiplication of the generator point and the multiplier;
   generating, by at least one of the one or more computing devices, a transformed private key based at least in part on the cryptographic private key and the random integer; and
   generating, by at least one of the one or more computing devices, a digital signature based at least in part on the transformed generator point and the transformed private key, wherein the digital signature is configured to be verified by a verification process which uses a cryptographic public key corresponding to the cryptographic private key.

2. The method as claimed in claim 1 wherein the transformed generator point and the transformed private key are generated in a secure environment.

3. The method as claimed in claim 2, wherein the secure environment comprises an offline environment.

4. The method as claimed in claim 1, wherein the transformed private key is generated by:
   multiplying the random integer by the private key to generate a value; and
   calculating the result of the value modulo n.

5. The method as claimed in claim 4 wherein generating a digital signature based at least in part on the transformed generator point and the transformed private key comprises:
   selecting a second random integer in the interval between 1 and n−1;
   determining a result point on the elliptical curve by performing elliptical curve multiplication of the transformed generator point and the second random integer;
   assigning the x co-ordinate of the result point to a first signature integer;
   determining whether the first signature integer is equal to zero;
   repeating the steps of selecting a second random integer and determining a result point when the first signature integer is equal to zero;
   calculating a second signature integer when the first signature integer is not equal to zero, wherein the second signature integer is calculated based at least in part on a hashed value of a message, the random integer, the transformed private key, and the first signature integer; and
   transmitting the first signature integer and the second signature integer based at least in part on a determination that the second signature is not equal to zero, wherein the first signature integer and the second signature integer are configured to be verified by a verification process which uses a cryptographic public key corresponding to the cryptographic private key.

6. The method as claimed in claim 1, wherein the second signature integer is calculated by:
   calculating a product of the hashed value of the message and the random integer to generate a first operand;
   calculating a product of the transformed private key and the first signature integer to generate a second operand;
   calculating a sum of the first operand and the second operand;
   calculating a product of the second random integer and the sum to generate a third operand; and
   assigning the second signature integer to an inverse of the third operand modulo n.

7. The method as claimed in claim 5 wherein calculating a second signature integer comprises utilizing a software routine which is obfuscated using a series of look-up tables such that the value of the first integer is not loaded into memory.

8. The method as claimed in claim 7 wherein calculating a second signature integer further comprises utilizing a software routine which is obfuscated using a series of look-up tables such that neither of the values of the first integer and the transformed private key are loaded into memory.

9. An apparatus for protecting a cryptographic private key during cryptographic digital signature generation, the apparatus comprising:
   one or more processors; and
   one or more memories operatively coupled to at least one of the one or more processors and having instructions stored thereon that, when executed by at least one of the one or more processors, cause at least one of the one or more processors to:
      generate a random integer in the interval between 1 and n−1, wherein n corresponds to the cardinality of a group of points on an elliptical curve that are generated within a finite field from a generator point on the elliptical curve and wherein n is greater than or equal to 1;
      calculate a multiplier based on the random integer, wherein the multiplier is equal to the inverse of the random integer modulo n;

determine a transformed generator point by performing elliptical curve multiplication of the generator point and the multiplier;

generate a transformed private key based at least in part on the cryptographic private key and the random integer; and generate a digital signature based at least in part on the transformed generator point and the transformed private key, wherein the digital signature is configured to be verified by a verification process which uses a cryptographic public key corresponding to the cryptographic private key.

10. The apparatus of claim 9, wherein the transformed generator point and the transformed private key are generated in an offline environment.

11. The apparatus of claim 9, wherein the transformed private key is generated by:

multiplying the random integer by the private key to generate a value; and calculating the result of the value modulo n.

12. The apparatus of claim 11, wherein the instructions that, when executed by at least one of the one or more processors, cause at least one of the one or more processors to generate a digital signature based at least in part on the transformed generator point and the transformed private key further cause at least one of the one or more processors to:

select a second random integer in the interval between 1 and n−1;

determine a result point on the elliptical curve by performing elliptical curve multiplication of the transformed generator point and the second random integer;

assign the x co-ordinate of the result point to a first signature integer;

determine whether the first signature integer is equal to zero;

repeat the steps of selecting a second random integer and determining a result point when the first signature integer is equal to zero;

calculate a second signature integer when the first signature integer is not equal to zero, wherein the second signature integer is calculated based at least in part on a hashed value of a message, the random integer, the transformed private key, and the first signature integer; and transmit the first signature integer and the second signature integer based at least in part on a determination that the second signature is not equal to zero, wherein the first signature integer and the second signature integer are configured to be verified by a verification process which uses a cryptographic public key corresponding to the cryptographic private key.

13. The apparatus of claim 12, wherein the second signature integer is calculated by:

calculating a product of the hashed value of the message and the random integer to generate a first operand;

calculating a product of the transformed private key and the first signature integer to generate a second operand;

calculating a sum of the first operand and the second operand;

calculating a product of the second random integer and the sum to generate a third operand; and assigning the second signature integer to an inverse of the third operand modulo n.

14. The apparatus of claim 12, wherein calculating a second signature integer further comprises utilizing a software routine which is obfuscated using a series of look-up tables such that neither of the values of the first integer and the transformed private key are loaded into memory.

15. At least one non-transitory computer-readable medium storing computer-readable instructions that, when executed by one or more computing devices, cause at least one of the one or more computing devices to:

generate a random integer in the interval between 1 and n−1, wherein n corresponds to the cardinality of a group of points on an elliptical curve that are generated within a finite field from a generator point on the elliptical curve and wherein n is greater than or equal to 1;

calculate a multiplier based on the random integer, wherein the multiplier is equal to the inverse of the random integer modulo n;

determine a transformed generator point by performing elliptical curve multiplication of the generator point and the multiplier;

generate a transformed private key based at least in part on the cryptographic private key and the random integer; and generate a digital signature based at least in part on the transformed generator point and the transformed private key, wherein the digital signature is configured to be verified by a verification process which uses a cryptographic public key corresponding to the cryptographic private key.

16. The at least one non-transitory computer-readable medium of claim 15, wherein the transformed generator point and the transformed private key are generated in an offline environment.

17. The at least one non-transitory computer-readable medium of claim 15, wherein the transformed private key is generated by:

multiplying the random integer by the private key to generate a value; and calculating the result of the value modulo n.

18. The at least one non-transitory computer-readable medium of claim 17, wherein the instructions that, when executed by at least one of the one or more computing devices, cause at least one of the one or more computing devices to generate a digital signature based at least in part on the transformed generator point and the transformed private key further cause at least one of the one or more computing devices to:

select a second random integer in the interval between 1 and n−1;

determine a result point on the elliptical curve by performing elliptical curve multiplication of the transformed generator point and the second random integer;

assign the x co-ordinate of the result point to a first signature integer;

determine whether the first signature integer is equal to zero;

repeat the steps of selecting a second random integer and determining a result point when the first signature integer is equal to zero;

calculate a second signature integer when the first signature integer is not equal to zero, wherein the second signature integer is calculated based at least in part on a hashed value of a message, the random integer, the transformed private key, and the first signature integer; and transmit the first signature integer and the second signature integer based at least in part on a determination that the second signature is not equal to zero, wherein the first signature integer and the second signature integer are configured to be verified by a verification process which uses a cryptographic public key corresponding to the cryptographic private key.

19. The at least one non-transitory computer-readable medium of claim 18, wherein the second signature integer is calculated by:
- calculating a product of the hashed value of the message and the random integer to generate a first operand;
- calculating a product of the transformed private key and the first signature integer to generate a second operand;
- calculating a sum of the first operand and the second operand;
- calculating a product of the second random integer and the sum to generate a third operand; and
- assigning the second signature integer to an inverse of the third operand modulo n.

20. The at least one non-transitory computer-readable medium of claim 18, wherein calculating a second signature integer further comprises utilizing a software routine which is obfuscated using a series of look-up tables such that neither of the values of the first integer and the transformed private key are loaded into memory.

* * * * *

UNITED STATES PATENT AND TRADEMARK OFFICE
CERTIFICATE OF CORRECTION

| | | |
|---|---|---|
| PATENT NO. | : 9,009,481 B2 | Page 1 of 1 |
| APPLICATION NO. | : 13/637811 | |
| DATED | : April 14, 2015 | |
| INVENTOR(S) | : Muir et al. | |

It is certified that error appears in the above-identified patent and that said Letters Patent is hereby corrected as shown below:

In the claims

In Col. 14, lines 29-40, claim 6, should read as follows:

--The method as claimed in claim 5, wherein the second signature integer is calculated by:

calculating a product of the hashed value of the message and the random integer to generate a first operand;

calculating a product of the transformed private key and the first signature integer to generate a second operand;

calculating a sum of the first operand and the second operand;

calculating a product of the second random integer and the sum to generate a third operand; and assigning the second signature integer to an inverse of the third operand modulo n.--

Signed and Sealed this
Seventeenth Day of November, 2015

Michelle K. Lee
*Director of the United States Patent and Trademark Office*